United States Patent [19]

Fiorentzis

[11] 4,224,652
[45] Sep. 23, 1980

[54] METHOD AND APPARATUS FOR DETECTING GROUND SHORTS IN THE ROTOR CIRCUIT OF A GENERATOR

[75] Inventor: Michael Fiorentzis, Wettingen, Switzerland

[73] Assignee: BBC Brown, Boveri & Company Limited, Baden, Switzerland

[21] Appl. No.: 875,691

[22] Filed: Feb. 6, 1978

[30] Foreign Application Priority Data

Mar. 1, 1977 [CH] Switzerland ............ 2548/77

[51] Int. Cl.² .................. H02H 7/06; H02H 3/16
[52] U.S. Cl. ........................... 361/42; 324/51; 324/158 MG; 361/20; 361/47; 340/650
[58] Field of Search ............ 361/47, 48, 49, 50, 361/42, 87, 23, 31, 20; 340/649, 650, 651, 658; 324/158 MG, 51, 54

[56] References Cited

U.S. PATENT DOCUMENTS

| 3,066,284 | 11/1962 | McKinley et al. | 361/49 X |
| 3,710,238 | 1/1973 | Peterson | 361/42 X |
| 3,783,340 | 1/1974 | Becker | 361/50 |
| 3,971,007 | 7/1976 | Borkovitz et al. | 340/651 |
| 3,975,663 | 8/1976 | Moorey | 361/50 X |
| 3,991,364 | 11/1976 | Wiznerowicz | 324/54 X |
| 4,080,642 | 3/1978 | Stolarczyk | 361/47 |
| 4,149,208 | 4/1979 | Fiorentzis | 361/47 X |

FOREIGN PATENT DOCUMENTS 2317805 10/1974 Fed. Rep. of Germany ............ 361/42

*Primary Examiner*—Patrick R. Salce
*Attorney, Agent, or Firm*—Werner W. Kleeman

[57] ABSTRACT

A method, and apparatus for, protecting an object, and specifically detecting ground shorts in the rotor circuit of a generator, wherein for essentially completely detecting a ground short the phase of an alternating signal is modulated to produce an alternating injection or test signal which is delivered to the object to be protected, i.e. the rotor circuit. A response signal corresponding to the injection signal and indicative of the ground short is derived from the rotor circuit. The modulated alternating signal may be at the network frequency and modulation of the phase thereon preferably encompasses continuously switching the phase of the alternating signal between two phase positions in the sense of a phase oscillation. The alternating signal is preferably in the form of an alternating voltage.

21 Claims, 4 Drawing Figures

METHOD AND APPARATUS FOR DETECTING GROUND SHORTS IN THE ROTOR CIRCUIT OF A GENERATOR

CROSS-REFERENCE TO RELATED CASE

This application is related to my commonly assigned, copending United States application Ser. No. 875,692, filed Feb. 6, 1978, now U.S. Pat. No. 4,149,208, granted Apr. 10, 1979.

BACKGROUND OF THE INVENTION

The present invention relates to a new and improved method of, and apparatus for, protecting an object, and specifically protecting ground shorts in the rotor circuit of a generator of an electrical network, wherein the rotor circuit, during normal operation, is shifted towards ground by a predetermined voltage, usually referred to as an injection or test voltage or signal, and as the injection voltage there can be used an alternating-current voltage which is at the network frequency.

Such type methods are part of the state-of-the-art. To explain this more fully, reference at this point will be made to a prior art arrangement as shown in FIG. 1 wherein the injection voltage Uv is delivered to the electrical system by means of the injection signal-transformer 3. A fault relay F then responds when, in the event of a ground short E, a current flows by virtue of the voltage Uv through the line 1. The capacitor K prevents the flow of a direct-current in the event of a ground short E. As the injection voltage Uv there has heretofore been selected a voltage which is at the network frequency or also a voltage which is not at the network frequency. The phase of such voltage does not change as a function of time. The drawback of this prior art technique resides in that regardless of the frequency of the voltage Uv there nonetheless exists the possibility that there can prevail a current having the same frequency as the injection voltage Uv and which flows through the capitances of the rotor circuit. With modern day generators employing thyristor excitation this possibility is increasingly great due to the large number of harmonics which arise at the rotor. Such disturbance current can cause faulty response of the protective device.

SUMMARY OF THE INVENTION

Therefore, it is a primary object of the present invention to provide an improved method of, and apparatus for, detecting ground shorts in the rotor circuit of a generator of an electrical network, in a manner not associated with the aforementioned drawbacks and limitations of the prior art proposals.

Now in order to implement these and still further objects of the invention, which will become more readily apparent as the description proceeds, the method of the present invention contemplates modulating the phase of an alternating signal to produce an alternating injection or test signal which is then delivered to the electrical network containing the rotor circuit of the generator. A response signal corresponding to the injection signal and indicative of the ground short is derived from the network. The response signal then can be beneficially employed for actuation of a protective device, such as a relay, in order to shutoff the electrical system or network or other object to be protected.

The alternating signal is preferably in the form of an alternating voltage. The modulated alternating signal preferably is at the network frequency, although this is not absolutely necessary, but does constitute an advantageous and simple manner of deriving the injection signal from the network. Modulation of the phase of the alternating signal may advantageously encompass continuously switching the phase of the alternating signal between two phase positions in the sense of a phase oscillation.

The invention, as already mentioned, concerns also apparatus for the performance of the inventive method. Such apparatus is characterized by the features that there is provided a transformer having two primary windings and a secondary winding, the secondary winding of which serves for applying the modulated alternating signal providing the alternating injection or test signal to the network or electrical system containing the rotor circuit. This alternating injection signal, typically in the form of the injection voltage is derived from a source which may work at the network frequency, but as already mentioned, it need not necessarily be operating at such network frequency. This signal source or voltage source is connected at one terminal or pole with the connection point or junction of both primary windings of the transformer and at the other terminal or pole thereof is connected in parallel with the inputs of two electronic switches, the outputs of which are connected in each case with a respective free end i.e. the other terminal of the respective primary windings. Both of the electronic switches are alternately opened at their control electrodes by the output signals of an oscillator. A working resistor is connected in parallel with the primary winding of an insulating or isolating transformer defining a response signal transformer, the secondary winding of which is connected with one input of a multiplier. At another input of the multiplier there appears as the reference frequency a voltage corresponding to the supply voltage of the source. At the output of the multiplier there appears an output signal which is delivered to a filter which performs an integration operation.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
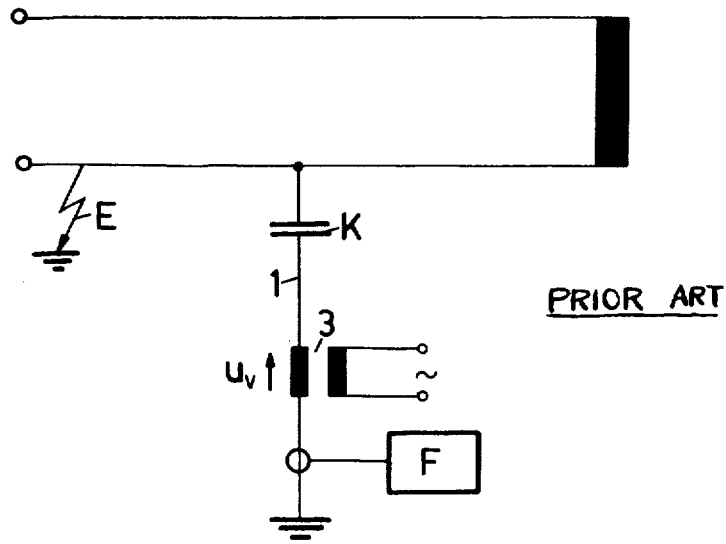
FIG. 1 is a circuit diagram of a prior art arrangement for explaining a prior art detection technique.

Turning attention now to the drawings, the prior art protection system of FIG. 1, already considered heretofore, utilizes a technique wherein the injection or test voltage Uv is delivered by means of the injection signal-transformer 3. A fault relay F responds whenever, in the presence of a ground short E, a current derived from the voltage Uv flows through the line 1. The capacitor K prevents flow of direct-current in the event of a ground short E. As also previously mentioned, up to the present time there has been used as the injection voltage Uv a voltage which may or may not be at the network frequency, and the phase of which remains constant as a function of time. What is disadvantageous with this prior art detection technique is the fact that regardless of the frequency of the voltage Uv there exists the possibility that there can appear a current at the same frequency as the injection voltage Uv which then flows through the capacitances of the rotor circuit. With modern day generator equipment, for the reasons previously discussed, such disturbance currents can lead to faulty response of the protective device, e.g., relay F.

Figure 2:
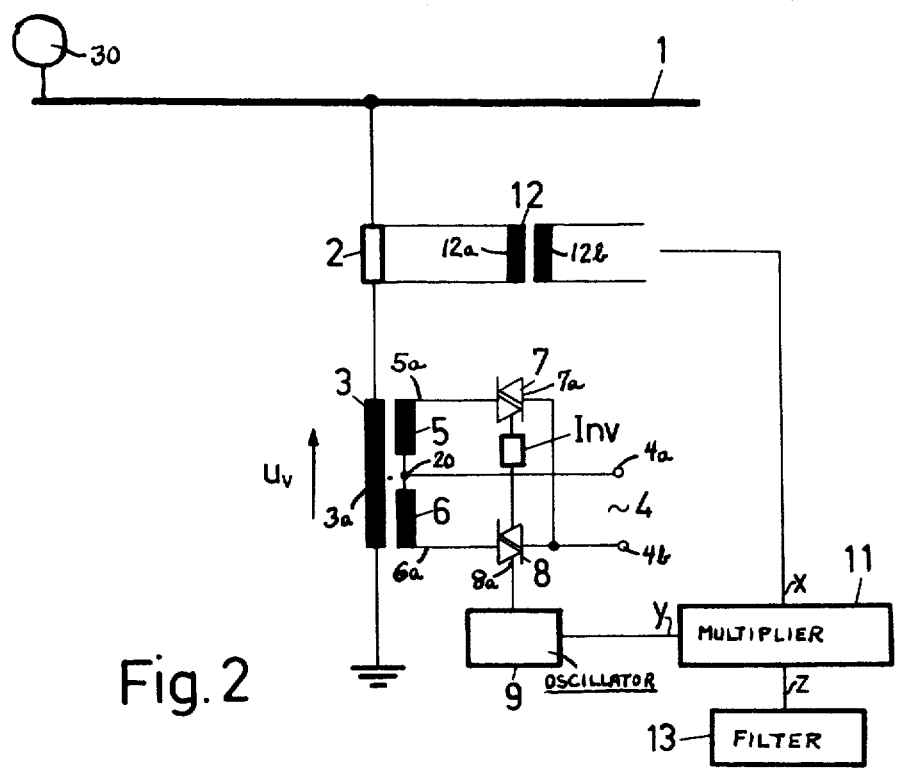
FIG. 2 is a circuit diagram of an arrangement according to the present invention, suitable for the practice of the method aspects thereof, and serving for detecting ground shorts at the rotor circuit of a generator in an electrical system or network.
Figure 3:
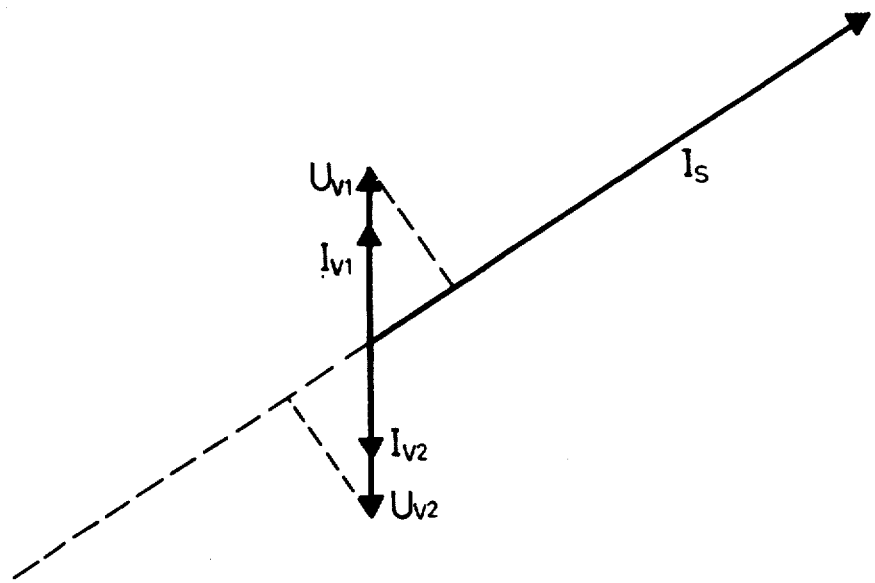
FIG. 3 graphically illustrates the two phase positions of the injection voltage Uv.
Figure 4:
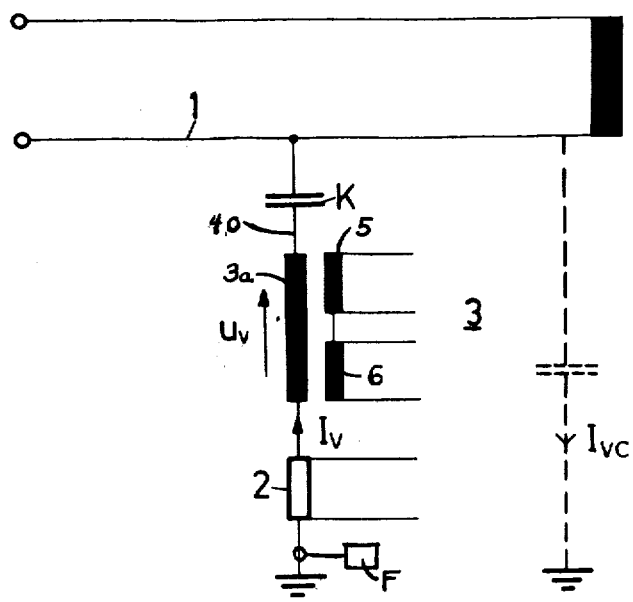
FIG. 4 is a circuit diagram of an arrangement, similar to that of FIG. 2, but incorporating a capacitor and resistor in the connection line between ground and the rotor circuit of the network.

Continuing, the invention will now be further explained in conjunction with FIGS. 2 to 4. In FIG. 2 there has been illustrated the functional principle of the phase oscillation element proposed according to the invention for producing the phase modulated alternating signal, constituting the injection or test signal, here in the form of an injection or test voltage Uv. The phase oscillation element comprises a phase modulation circuit embodying a supply source 4 from which there is derived the injection or test voltage Uv. The source 4 may be assumed to be operating at the network frequency, although, as mentioned, other frequencies can be employed. Using a supply source 4 at the operating frequency constitutes a convenient means for producing the injection voltage Uv. The injection signal i.e., the injection voltage Uv is coupled into the electrical system i.e., the object 1 to be protected, here assumed to be the network containing a generator rotor circuit, generally indicated by reference character 30, and ground by means of a working or detection resistor 2 and the injection signal-transformer 3. This injection signal-transformer 3 will be seen to have two primary windings 5 and 6 and a secondary winding 3a. The secondary winding 3a is connected between ground and the object 1 to be protected by means of the working resistor 2. On the other hand, the two primary windings 5 and 6 can be connected with the supply source 4 by means of two electronic switches 7 and 8, here shown in the form of triacs. The one terminal or pole 4a of the source 4 is connected with the common node or junction 20 of both primary windings 5 and 6 of the transformer 3, whereas the other terminal 4b of such source 4 is connected via the triacs 7 and 8 with the free end or other connection point or terminal 5a and 6a of such primary windings 5 and 6 respectively. Both of the electronic switches 7 and 8, i.e., the triacs, are alternately opened at their control gates or electrodes, generally indicated by reference characters 7a and 8a respectively, by means of the output signals of an oscillator 9. This oscillator 9 alternately opens the triacs 7 and 8 at a desired predetermined switching frequency (1/t₁), wherein t₁ advantageously constitutes a predetermined triggering or firing time of the triacs and a remaining safety time, as will be explained by way of example more fully hereinafter, whereby the injection voltage Uv has its phase shifted by the switching frequency between 0° and 180°, i.e., the phase positions are out of phase by 180° with respect to one another. Reference character or symbol Inv constitutes an inverter or reversing means for obtaining the correct control signal phases.

Turning attention to FIG. 3, the two phase positions of the injection or test voltage Uv have been designated by reference characters Uv₁ and Uv₂. In the case of an insulation fault at the protected object 1 a current Iv (Iv₁, Iv₂ in FIG. 3) which is derived from the injection voltage Uv flows through the working resistor 2 and at that location produces a voltage drop defining a response voltage which is applied to the primary winding 12a of the insulation or response transformer 12. This response voltage in the form of such voltage drop is delivered by means of the secondary winding 12b of the response signal-transformer 12 (FIG. 2) to an input x of a multiplier 11. At the other input y of the multiplier 11 there appears the voltage Uv as a reference signal, and which may be directly supplied by the source 4. However, in order to avoid any effect of disturbance currents by the impedances of the injection signal-transformer 3, it is possible to also separately synchronously generate the reference signal. This is so for the circuit arrangement of FIG. 2, where the reference signal generator together with the oscillator is shown in a single block 9.

The measurement current flowing through the working resistor 2 is composed of a useful signal (response signal) Iv and an undefined disturbance signal Is. The disturbance signal Is can be of random frequency, phase position and within certain limits also amplitude. The product at the output z of the multiplier 11 can be expressed by the following: B=Uv x (Iv+Is)=Uv·Iv+Uv·Is.

The part UvIs, when integrated over a random long time tg, equals null. Therefore, there is present at the resistor 2 the possibility of distinguishing between the response signal, here the useful current Iv, the amplitude of which is great only in the case of a ground short at the rotor circuit 30, and all possible disturbance current Is. Integration is accomplished at the filter 13. The integration result i.e. the processed signal then can be beneficially employed to activate a suitable protective device, such as a relay, to shutdown the object 1 to be protected.

Tests carried out at a prototype circuit have found the following values to be advantageous by way of example:

Uv=2% of the amplitude of the network phase voltage.

t₁=60 ms, wherein the triacs 7 and 8 are only fired for 45 ms, the remaining time 15 ms serves as a security or safety time in order to avoid simultaneous firing of both triacs by the disturbance currents. The predetermined switching frequency amounts to 1t₁ as previously explained.

13= filter of the 12th order (~50 dB).

FIG. 4 shows the connection of the protective device which is essentially similar to the arrangement of FIG. 2, wherefore to simplify the illustration parts of the circuitry have been omitted, and there here will be only considered in detail the changes from the circuit arrangement of FIG. 2. Here there is provided a capacitor K, already discussed briefly in conjunction with the arrangement of FIG. 1, and this capacitor is connected in series with the injection signal-transformer 2 and the working resistor 2 in the line 40 between the object to be protected 1, i.e. the network containing the generator-rotor circuit and ground. By means of the capacitor K there is prevented a flow of direct-current in the event of a ground short. The working resistor 2 serves for measuring the useful current Iv as previously explained. Dimensioning of the capacitor K and the resistor 2 or replacement of the resistor by a current converter, are matters well within the skill of one knowledgeable in this art. The measuring angle of the multiplier can be chosen, by rotating the reference voltage, such that capacitive rest or static currents Ivc (FIG. 4) which flow by virtue of the natural capacitances of the rotor circuit, are not incorporated into the measurement result. A fault relay F may be incorporated in the connection line between the secondary 3a of the transformer 3 and ground.

While there are shown and described present preferred embodiments of the invention, it is to be distinctly understood that the invention is not limited thereto, but may be otherwise variously embodied and practiced within the scope of the following claims. Accordingly,

What I claim is:

1. A method of detecting ground shorts in generator rotor circuits of an electrical network, wherein for detecting essentially completely a ground short at the rotor circuit there are carried out the steps of:
    modulating the phase of an alternating signal to produce an alternating injection signal;
    delivering the alternating injection signal to the electrical network containing the rotor circuit at which there is to be detected any ground short; and
    deriving from the electrical network a response signal corresponding to the alternating injection signal and indicative of the ground short at the rotor circuit.

2. The method as defined in claim 1, further including the steps of:
    utilizing as the alternating signal an alternating voltage.

3. The method as defined in claim 1, wherein the phase modulation comprises the steps of:
    continuously switching the phase of the alternating signal forming the injection signal between two phase positions.

4. The method as defined in claim 3, wherein:
    the phase of the alternating signal forming the injection signal is switching between two phase positions in the sense of a phase oscillation.

5. The method as defined in claim 1, wherein:
    the alternating signal which is phase modulated is at the network frequency.

6. The method as defined in claim 1, wherein the phase modulation comprises the steps of:
    switching the phase of the alternating signal forming the injection signal between two phase positions which are opposite in phase to one another.

7. The method as defined in claim 6, including the steps of:
    performing phase switching of the alternating signal during switching periods amounting to about 60 ms.

8. The method as defined in claim 7, wherein:
    each of the switching periods encompasses a triggering time of about 45 ms and a remaining time constituting a safety time.

9. The method as defined in claim 1, wherein:
    the alternating signal is an alternating voltage; and
    the amplitude of said alternating injection voltage amounts to about 2% of the network phase voltage.

10. An apparatus for detecting ground shorts in a generator rotor circuit of an electrical network comprising:
    a transformer having two primary windings and a secondary winding for supplying an alternating injection voltage;
    said secondary winding serving to apply the injection voltage to the electrical network;
    a source for producing the injection voltage;
    said source having a pair of terminals;
    said source being connected at one terminal with a junction point of both primary windings of the transformer;
    two electronic switch means having inputs and outputs;
    said source being connected at its other terminal in parallel with the inputs of said two electronic switch means;
    a respective output of each of said electronic switch means being connected with the other terminal of a respective one of said primary windings;
    an oscillator delivering an output signal for alternately opening said electronic switch means;
    an insulation transformer having a primary winding and a secondary winding;
    a working resistor connected in parallel with the primary winding of said insulation transformer;
    said secondary winding of said insulation transformer delivering a response voltage corresponding to the injection voltage and indicative of a ground short at the rotor circuit;
    a multiplier having a first input and a second input;
    said response voltage of the insulation transformer being delivered to the first input of said multiplier;
    means for applying a voltage constituting a reference signal to the second input of the multiplier;
    said multiplier having an output carrying an output signal;
    a filter for carrying out an integration operation;
    the output signal of the multiplier being delivered to the filter.

11. The apparatus as defined in claim 10, wherein:
    said source operates at the network frequency.

12. The apparatus as defined in claim 10, wherein:
    said voltage applying means delivers a reference voltage substantially equal to the network frequency.

13. The apparatus as defined in claim 10, wherein:
    said voltage applying means delivers said injection voltage as said reference voltage at the second input of the multiplier.

14. The apparatus as defined in claim 10, wherein:
    said voltage applying means supplies a separate signal which is generated essentially in synchronism with the injection voltage and which appears as said reference signal at the second input of the multiplier.

15. The apparatus as defined in claim 10, wherein:
    said electronic switch means comprise triacs.

16. The apparatus as defined in claim 15, wherein:
    the ampltiude of said injection voltage amounts to about 2% of the network phase voltage.

17. The apparatus as defined in claim 16, wherein:
    the triacs have switching periods amounting to about 60 ms.

18. The apparatus as defined in claim 15, wherein:
    the triacs have switching periods amounting to about 60 ms;

said triacs being fired for about 45 ms and the remainder of the time serving as a safety time in order to prevent simultaneous firing of both triacs by disturbance currents.

19. The apparatus as defined in claim 18, further including:
   a capacitor connected between the secondary winding of the injection voltage-supplying transformer and the rotor circuit of the network.

20. The apparatus as defined in claim 19, further including:
   fault relay means arranged in a connection line between the secondary winding of the injection voltage-supplying transformer and ground.

21. A method of detecting ground shorts in electrical devices of an electrical network, especially at a rotor circuit of a generator, wherein for detecting essentially completely a ground short at the electrical device there are carried out the steps of:
   modulating by means of a modulation function the phase of an alternating signal to produce an alternating injection signal;
   delivering the alternating injection signal to the electrical network containing the electrical device at which there is to be detected any ground short;
   deriving from the electrical network a response signal corresponding to the alternating injection signal;
   demodulating the response signal to form a signal indicative of the ground short at the electrical device.

* * * * *